United States Patent Office.

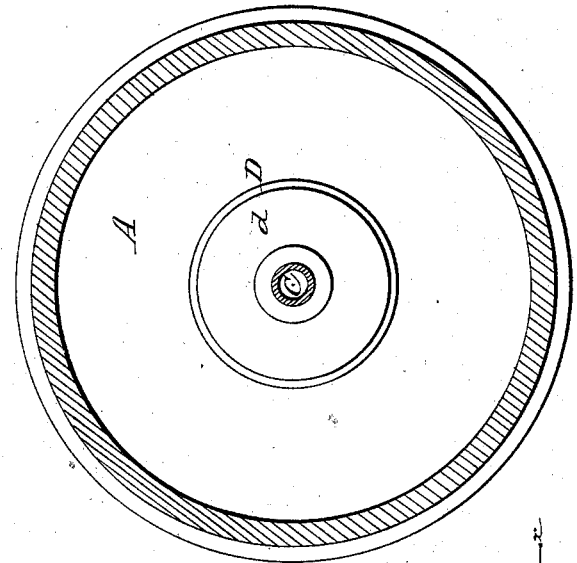
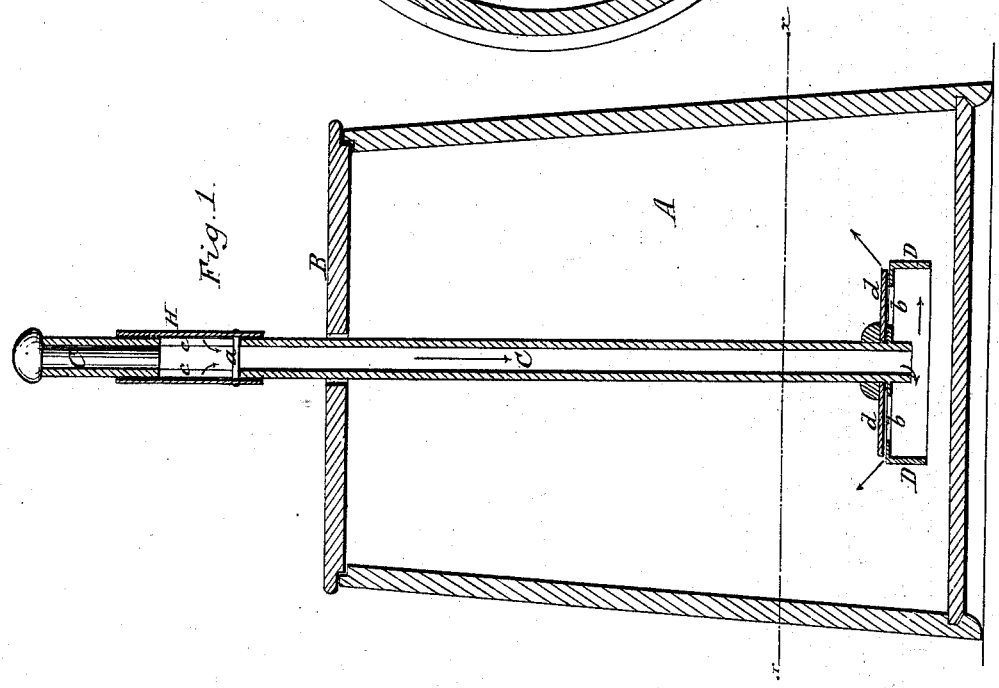

BENJAMIN HANDFORTH, OF CHICAGO, ILLINOIS.

Letters Patent No. 62,129, dated February 19, 1867; antedated February 3, 1867.

IMPROVEMENT IN CHURNS.

The Schedule referred to in these Letters Patent and making part of the same.

TO ALL WHOM IT MAY CONCERN:

Be it known that I, BENJAMIN HANDFORTH, of Chicago, in the county of Cook, and State of Illinois, have invented a new and useful Improvement in Churns; and I do hereby declare and make known that the following is a full, clear, and exact description of the same, reference being had to the accompanying drawings, and the letters and figures marked thereon, which form part of this specification.

The said invention consists in a novel arrangement whereby the atmospheric air is introduced into the cream being churned through the handle of the dasher, and thereby greatly agitating the same and rapidly converting it into butter as desired.

To enable those skilled in the art to understand how to construct and use my invention, I will proceed to describe the same with particularity, making reference in so doing to the aforesaid drawings, in which—

Figure 1 represents a central vertical section of my invention; and

Figure 2 a transverse section of the same, taken at $x$ in fig. 1.

Similar letters of reference in the different figures denote the same parts of my invention.

A represents an ordinary upright churn, having a removable cover, B, through the centre of which the dasher handle C is arranged, so as to have a vertical reciprocating movement in the usual manner with churns of this class. The said handle C is hollow, as indicated in the drawings, being open at the lower end and closed at the top, but being provided at the sides near the top with slotted or other openings, marked $c$, and having an adjustable sleeve fitting upon the handle C, marked H, as shown, whereby said openings may be opened and closed, as hereinafter described. Upon the lower end of the handle C is secured a dasher in the form of an inverted shallow cup or pan, D, of suitable dimensions, provided with openings $b$ which are closed by means of a suitable valve or valves arranged above them upon the dasher, as shown at $d$.

Having described the construction of my invention, I will now specify the manner of its operation. The cream having been placed in the churn, the operator grasps with his hand the sliding sleeve H to raise the dasher, said slide moving upward independently of the handle, until the openings $c\ c$ are exposed, and the tube or hollow handle is filled with air. The pin $a$ passing through the slots $c\ c$, reaching the top of the slot or the top of the sleeve, coming in contact with a knob upon the top of the handle, the upward movement then raises the dasher. When the operator presses down to force the dasher into the cream, the sleeve H first moves down and covers the openings $c\ c$, so as to prevent the escape of the air from the tube C, when the pin $a$ strikes upon the lower end of the slots $c$, and the downward movement of the sleeve then moves the dasher down into the cream, when the valves $d$ open, and the cream and air are forced up through the openings $b$ in the dasher, thereby greatly agitating the cream, and rapidly converting the same into butter. To gather the butter a plug may be inserted in the lower end of this tube C, when the upward and downward motion of the dasher will readily accomplish the desired end; the valve $d$ being also removably attached upon the dasher, so as to be taken off when the butter is being gathered as described.

Having described the construction and operation of my invention, I will now specify what I claim, and desire to secure by Letters Patent:

1. I claim the combination of the hollow handle C, provided with an opening or openings $c$, and the sliding sleeve H, arranged and operating substantially as and for the purposes set forth.

2. I claim the combination and arrangement of the hollow handle C, provided with openings $c$, the sleeve H, and valved dasher $d\ d$, operating substantially as described and for the purposes specified.

BENJN. HANDFORTH.

Witnesses:
W. E. MARRS,
J. N. HERTHEL.